United States Patent
Bostick et al.

(10) Patent No.: US 9,764,243 B2
(45) Date of Patent: Sep. 19, 2017

(54) INTEGRATING TOPIC OF STUDY CONTENT INTO VIDEO GAMES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 14/854,189

(22) Filed: Sep. 15, 2015

(65) Prior Publication Data

US 2017/0072319 A1   Mar. 16, 2017

(51) Int. Cl.
| | |
|---|---|
| *A63F 13/60* | (2014.01) |
| *A63F 13/80* | (2014.01) |
| *G09B 7/04* | (2006.01) |
| *G09B 5/06* | (2006.01) |
| *G09B 7/02* | (2006.01) |

(52) U.S. Cl.
CPC .............. *A63F 13/80* (2014.09); *G09B 5/065* (2013.01); *G09B 7/02* (2013.01); *G09B 7/04* (2013.01); *A63F 2300/8064* (2013.01)

(58) Field of Classification Search
CPC .. A63F 13/80; A63F 2300/8064; G09B 5/065
USPC ........................................................ 463/40
See application file for complete search history.

(56) References Cited

U.S. PATENT DOCUMENTS

| | | | |
|---|---|---|---|
| 6,024,572 A | 2/2000 | Weyer | |
| 7,895,076 B2* | 2/2011 | Kutaragi | ................. A63F 13/77 |
| | | | 705/14.4 |
| 2002/0022516 A1* | 2/2002 | Forden | .................... A63F 13/10 |
| | | | 463/32 |
| 2004/0029633 A1 | 2/2004 | Wen et al. | |
| 2005/0079471 A1 | 4/2005 | Rogan et al. | |
| 2007/0281285 A1 | 12/2007 | Jayaweera | |
| 2009/0061399 A1* | 3/2009 | Freeman | ................. G09B 7/00 |
| | | | 434/157 |

(Continued)

OTHER PUBLICATIONS

"Gamification," Wikipedia, the free encyclopedia, dated Jul. 16, 2015, 12 pages. Accessed Jul. 22, 2015, https://en.wikipedia.org/wiki/Gamification.

(Continued)

*Primary Examiner* — Allen Chan
(74) *Attorney, Agent, or Firm* — Yee & Associates, P.C.; Lisa Ulrich (57) ABSTRACT

Integrating topic of study content into video games is provided. A request is received from a client gaming device for content of a set of one or more topics of study of a plurality of different topics of study to incorporate into a video game of a plurality of different video games based on a user profile. The content of the set of one or more topics of study to be incorporated into the video game based on the user profile and a set of integration points corresponding to the video game is retrieved from a storage device. The content of the set of one or more topics of study to be incorporated into the video game based on the user profile and the set of integration points corresponding to the video game is sent to the client gaming device.

17 Claims, 8 Drawing Sheets

(56) References Cited

U.S. PATENT DOCUMENTS

| | | | | |
|---|---|---|---|---|
| 2009/0099928 A1* | 4/2009 | Vasile | ................... | A63F 13/10 |
| | | | | 705/14.5 |
| 2009/0226871 A1 | 9/2009 | Etuk et al. | | |
| 2012/0064499 A1* | 3/2012 | Samuelson | ............. | G09B 7/00 |
| | | | | 434/309 |
| 2013/0203033 A1* | 8/2013 | Cheng | ................... | G09B 19/00 |
| | | | | 434/276 |

OTHER PUBLICATIONS

"Math, Together," Thinksy Educational Math Gaming, copyright 2015, SenseiX Inc., 2 pages. Accessed Jul. 22, 2015, https://www.thinksylearn.com/index.html.

Cai, "Adapting Existing Games for Education using Speech Recognition," Thesis, Master of Science in Computer Science and Engineering, Massachusetts Institute of Technology, Jun. 2013, 77 pages.

\* cited by examiner

INTEGRATING TOPIC OF STUDY CONTENT INTO VIDEO GAMES

BACKGROUND

1. Field

The disclosure relates generally to video games and more specifically to integrating topic of study content into regular gameplay of existing video games using topic of study application programming interface plug-ins and game developer-defined integration points.

2. Description of the Related Art

Gamification has proven to be an efficient teaching method. Gamification uses game thinking and game design to engage and teach players of video games. Gamification is particularly of interest to student players, who are typically the target demographic for video games. As a result, an industry of educational video games has been created. While educational video games help make learning more fun, these educational video games are typically low budget, heavily focused on teaching, and compare poorly to triple-A high budget video games. Consequently, many students eventually tire of playing these low budget educational video games, get distracted, and then start playing "real" video games instead of studying.

SUMMARY

According to one illustrative embodiment, a computer-implemented method for integrating topic of study content into video games is provided. A computer receives a request from a client gaming device for content of a set of one or more topics of study of a plurality of different topics of study to incorporate into a video game of a plurality of different video games based on a user profile. The computer retrieves the content of the set of one or more topics of study to be incorporated into the video game based on the user profile and a set of integration points corresponding to the video game from a storage device. The computer sends the content of the set of one or more topics of study to be incorporated into the video game based on the user profile and the set of integration points corresponding to the video game to the client gaming device. According to other illustrative embodiments, a computer system and computer program product for integrating topic of study content into video games are provided.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

Figure 1:
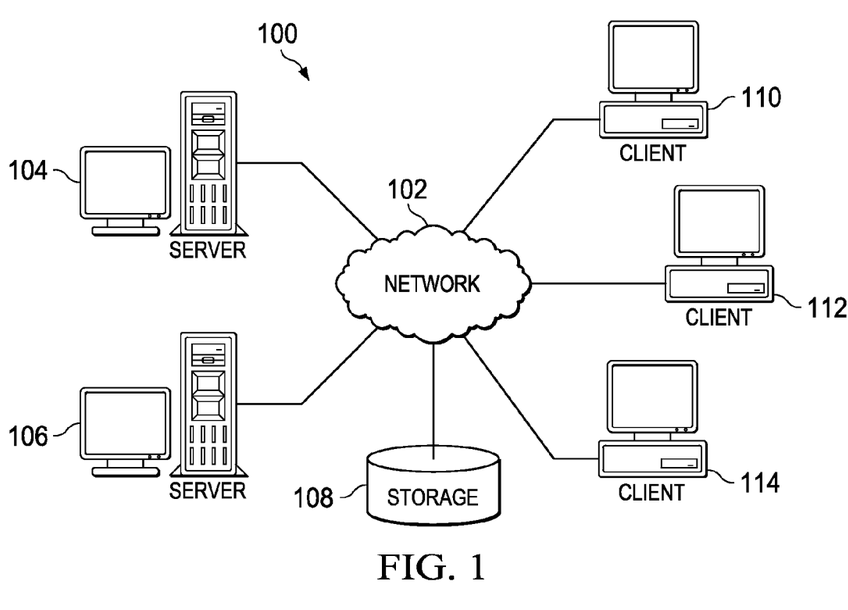
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, central learning game server computers with high-speed connections to network 102. In addition, server 104 and server 106 may provide services, such as, for example, controlling integration or incorporation of topic of study content into a plurality of different types of video games currently being played by a plurality of different client gaming device users. It should be noted that server 104 and server 106 may incorporate the same topic of study content into a plurality of different types of video games consistent with regular gameplay of the plurality of different types of video games. Also, server 104 and server 106 may incorporate different topics of study content into two or more of the plurality of different types of video games consistent with regular gameplay of the two or more of the plurality of different types of video games.

Client 110, client 112, and client 114 also connect to network 102. Clients 110, 112, and 114 are client gaming devices of server 104 and server 106. Server 104 and server 106 may provide information, such as, for example, boot files, operating system images, software applications, video games, and content, such as text and/or graphics, corresponding to topics of study to be incorporated into the video games consistent with regular gameplay, to clients 110, 112, and 114.

In this example, clients 110, 112, and 114 are computers, such as desktop computers or network computers with wire or wireless communication links to network 102. However, it should be noted that clients 110, 112, and 114 are intended as examples only. In other words, clients 110, 112, and 114 may include laptop computers, tablet computers, handheld computers, smart phones, smart watches, personal digital assistants, and gaming devices, for example. Users of clients 110, 112, and 114 may use clients 110, 112, and 114 to play video games and complete topics of study assigned by educators to the users while the users play the video games.

Storage 108 is a network storage device capable of storing any type of data in a structured format or an unstructured format. In this example, storage 108 may represent a set of one or more databases or repositories that store different types of data, such as a plurality of different types of video games, sets of integration points corresponding to each of the video games that are used to position topic to study content within the video games, a plurality of topic of study application programming interface plug-ins for incorporating the topic of study content into the video games, a plurality of different topics of study with corresponding content, instructions for incorporating the topic of study content into the integration points of respective video games, video game checkpoint questions corresponding to the topic of study content incorporated into respective video games, checkpoint question passing scores, and a plurality of client gaming device user names and corresponding user profiles. Further, storage unit 108 may store other data, such as authentication or credential data that may include user names, passwords, and biometric data associated with the plurality of users and system administrators.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

Figure 2:
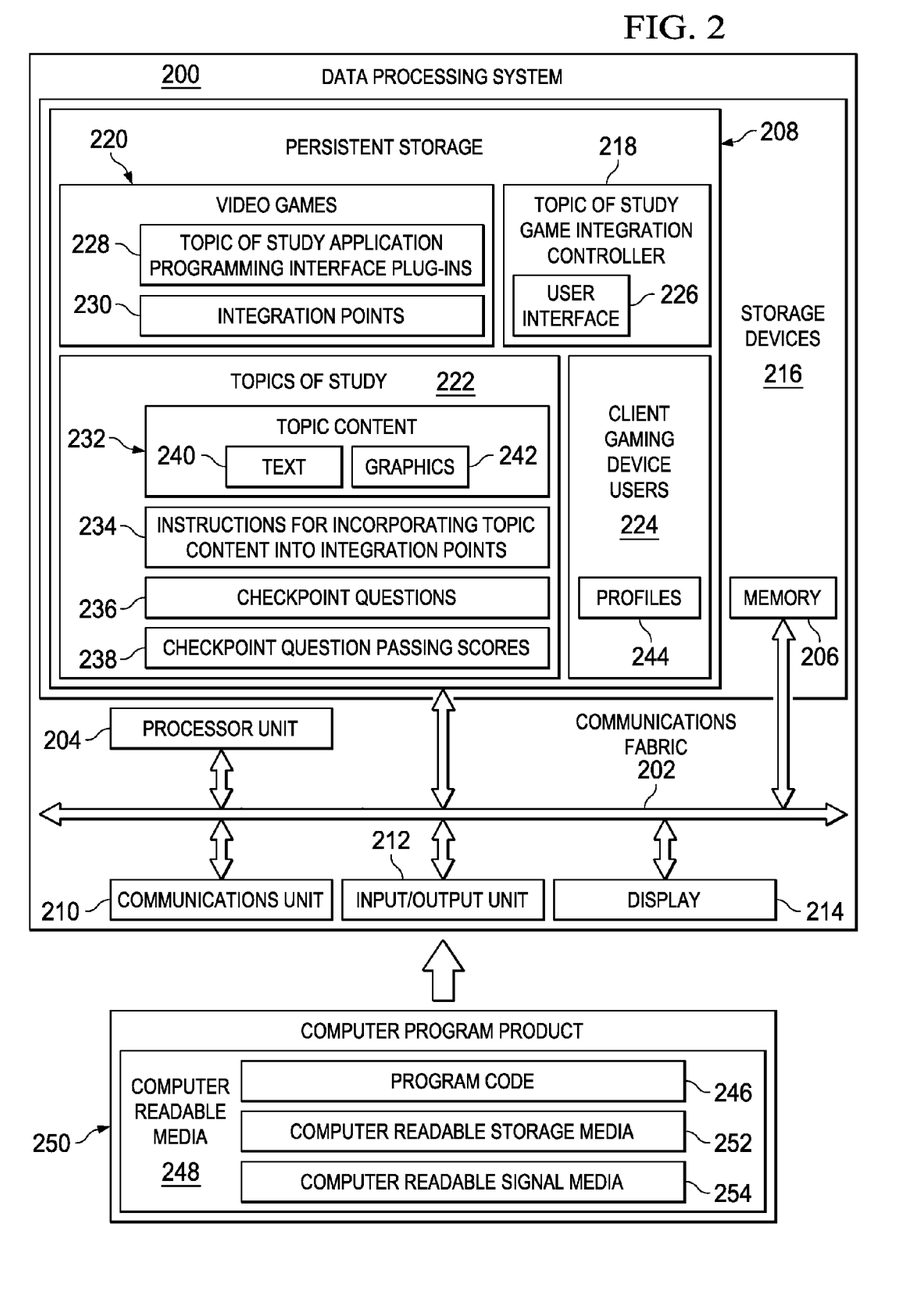
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 or client 110 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores topic of study game integration controller 218, video games 220, topics of study 222, and client gaming device users 224. Topic of study game integration controller 218 controls incorporation of topic of study content into existing video games, consistent with regular gameplay, at pre-defined in-game asset integration points. Topic of study game integration controller 218 includes user interface 226. User interface 226 is a network or Web interface that allows users, such as game developers and educators, to input information.

Game developers may utilize user interface 226 to provide the pre-defined in-game asset integration points for locating topic of study content within video games. Educators may utilize user interface 226 to provide the topic of study content to be incorporated into the video games at the pre-defined in-game asset integration points. User interface 226 allows educators to add educational content for specific video games with support for multiple instances of educational content by different educators. For example, educational video game content provided by educator S for history class students at ABC High School is one instance, whereas educational video game content provided by educator T for history class students at XYZ Middle School is another instance. When a history class student plays a video game, the video game, via a customized application programming interface, integrates with data processing system 200 to retrieve the appropriate educational content assigned by the educator to the history class student while the history class student is playing the video game.

Video games 220 represent a plurality of different types of video games, such as racing video games, adventure video games, action video games, war video games, puzzle video games, and the like. In other words, video games 220 may represent any type of existing video game. Video games 220 include topic of study application programming interface plug-ins 228 and integration points 230.

Topic of study application programming interface plug-ins 228 are customized application programming interface plug-ins that allow game developers to add hooks into existing video games at game developer-specified points for educators to add the educational content, as well as, checkpoints in the video games to determine whether a student has learned the educational content well enough to advance to a next level or to continue playing. Integration points 230 define where and how topic of study content is integrated into in-game assets, such as billboards and documents, of a particular video game. Each particular video game has its own corresponding set of in-game asset integration points.

Topics of study 222 represent a plurality of different areas of educational information and facts that educators want students to learn. Topics of study 222 may include, for example, history topics of study, such as early American and world history, math topics of study, such as geometry and algebra, science topics of study, such as chemistry and biology, English topics of study, such as sentence structure and phonics, foreign language topics of study, such as German and French, art topics of study, such as artists and their particular styles of art, and the like. Topics of study 222 include topic content 232, instructions for incorporating topic content into integration points 234, checkpoint questions 236, and checkpoint questions passing scores 238.

Topic content 232 is the specific content associated with each particular topic of study and may include text 240 and graphics 242. Text 240 is textual content corresponding to each particular topic of study. Graphics 242 are images, such as photographs, video clips, pictures, maps, designs, and the like, which correspond to each particular topic of study. It should be noted that topic content 232 corresponding to a particular topic of study may include text only, graphics only, or a combination of text and graphics.

Instructions for incorporating topic content into integration points 234 define where topic of study content is to be incorporated at the game-developer defined in-game asset integration points within each particular video game. Checkpoint questions 236 are questions added by educators at pre-defined points within a video game to test a student's knowledge of assigned topic of study content, which has been incorporated into the video game the student is currently playing. Checkpoint question passing scores 238 are defined by educators and represent a threshold level of knowledge a student must obtain to continue playing a video game or advance to a next level within a video game, for example.

Client gaming device users 224 lists a plurality of different users, such as students, that use client gaming devices. Profiles 244 represent a plurality of user profiles that correspond to each particular client gaming device user. A user profile may include, for example, user name, user identification number, name of school user is currently attending, names of current educators or teachers, topics of study assigned to the user by one or more educators, name of gaming device the user utilizes to play video games, names of video games the user plays, checkpoint question scores, and the like.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as a system administrator, and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that a method was needed to incorporate educational content into existing high budget video games that students already enjoy playing. Existing educational games are typically created from scratch to incorporate educational content. However, illustrative embodiments allow educational topic of study content to be dynamically incorporated into existing video games while players are playing the video games. In addition, illustrative embodiments allow topic of study content to be dynamically changed within the same video game so that a player can, for example, play an action video game and learn about a topic of study regarding King Ludwig II and then play the same action video game again and learn about a topic of study regarding rules of grammar. Further, illustrative embodiments allow the same topic of study content to be incorporated into different video games. For example, a player may play a racing video game and learn about the topic of study regarding King Ludwig II, stop playing the racing video game, and then start playing an adventure video game and continue learning about the same topic of study regarding King Ludwig II.

Illustrative embodiments provide a framework that allows game developers to add hooks into existing video games at specific in-asset integration points, which allow educators to add educational topic of study content into the existing video games at the game developer-specified in-game asset integration points. Educators create textual and graphical educational content around a topic of study and this educational content is incorporated into the existing video games in a manner consistent with the regular gameplay of the video games. In other words, the player experiences the same gameplay within the video games as before, but now topic of study content is added to the video games during regular gameplay. As players play the video games, which are modified with the topic of study content, the players encounter the topic of study content that results in educational value to playing the video games so modified. Further, illustrative embodiments may measure or assess the educational value of the topic of study content using checkpoint questions at pre-defined locations within the video games to test level of knowledge achieved by the players.

Consider a series of existing video games, which are enabled with illustrative embodiments. Illustrative embodiments extend these existing video games to incorporate educational learning goals. The series of existing video games may include, for example, a racing video game, an action/adventure video game, and a puzzle video game. Now an educator or teacher may set an assignment for a class of students to learn 10 facts about King Ludwig II, for example. Each student may use the video game of his or her choice to learn these 10 facts about King Ludwig II. For example, student #1 plays his favorite racing video game and an illustrative embodiment integrates these 10 facts about King Ludwig II onto in-game assets, such as billboards, signs, and the walls around the race track. Student #2 plays her favorite adventure video game and an illustrative embodiment incorporates the same 10 facts about King Ludwig II onto in-game assets, such as flags, banners, tapestries, and shields on the walls of a castle. Therefore, illustrative embodiments expose each particular student to the same educational topic of study content, but in a manner consistent with the regular gameplay of the video game being played by each particular student. Game developers define which in-game assets or resources are appropriate for displaying the educational topic of study content and educators/teachers define what educational topic of study content the educators would like to display to the students within the video games.

Thus, illustrative embodiments incorporate educational topic of study content into a video game currently being played, whereby the educational topic of study content is tailored for the specific gameplay type of the video game, and the educational topic of study content is transferable between different video games (e.g., two students play two different video games and see the same set of topic of study checkpoint questions rendered in game-appropriate ways). In other words, illustrative embodiments incorporate into different video games the same learning goals in different ways.

Figure 3:
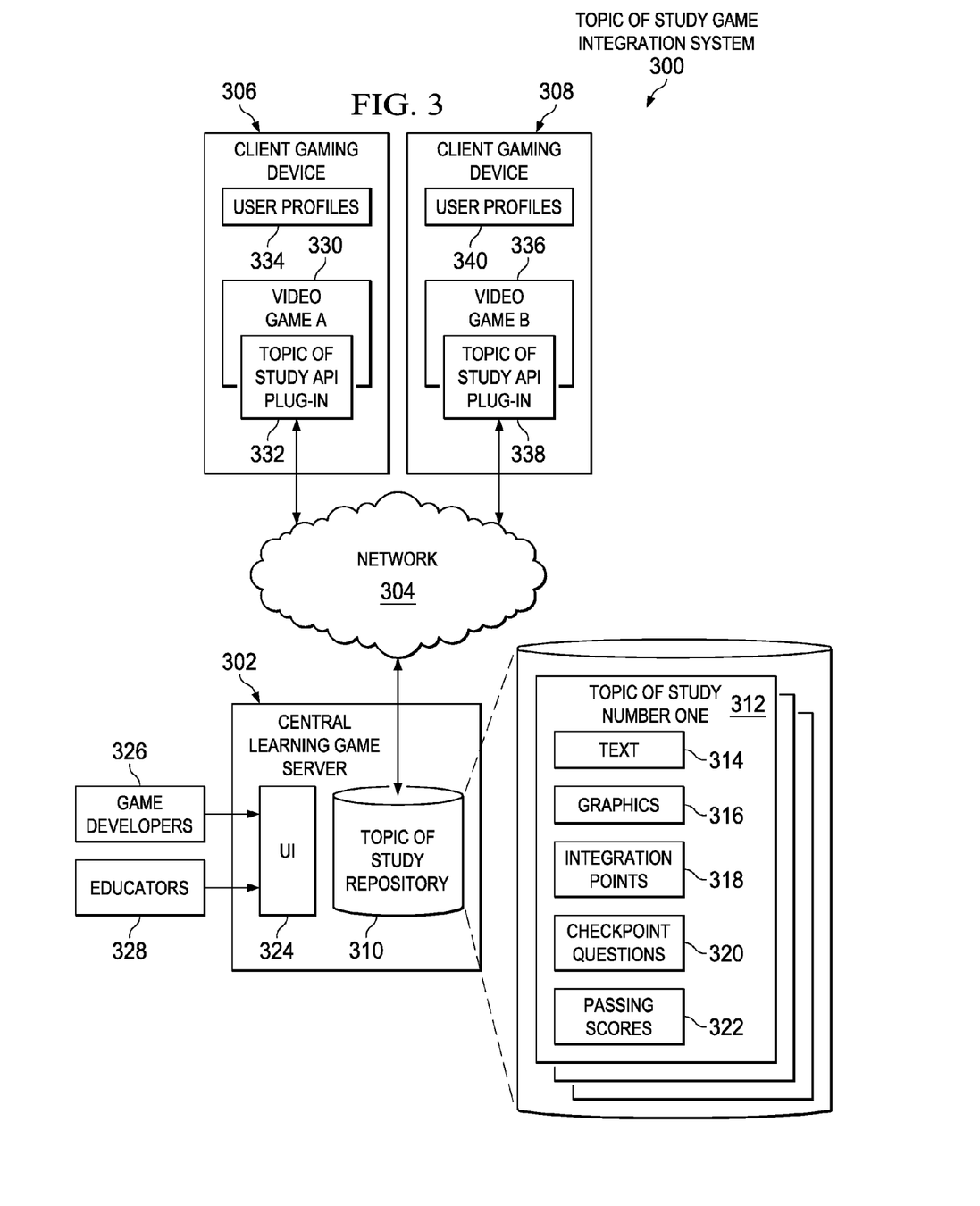
FIG. 3 is a diagram of an example of a topic of study game integration system in accordance with an illustrative embodiment.

With reference now to FIG. 3, a diagram of an example of a topic of study game integration system is depicted in accordance with an illustrative embodiment. Topic of study game integration system 300 may be implemented in a network of distributed data processing systems, such as network data processing system 100 in FIG. 1. In this example, topic of study game integration system 300 includes central learning game server 302, network 304, client gaming device 306, and client gaming device 308. However, it should be noted that topic of study game integration system 300 is only intended as an example and may include any number of central learning game servers, networks, and client gaming devices.

Central learning game server 302, network 304, client gaming device 306, and client gaming device 308 may be, for example, server 104, network 102, client 110 and client 112 in FIG. 1, respectively. In addition, central learning game server 302 may be implemented in a data processing system, such as data processing system 200 in FIG. 2. Central learning game server 302 controls and coordinates integration of topic of study content within video games. In this example, central learning game server 302 is a cloud-based server connected to network 304. Central learning game server 302 hosts topic of study repository 310.

In this example, topic of study repository 310 includes topic of study #1 312. Topic of study #1 312 represents a plurality of different topics of study. The plurality of different topics of study may be profiled by, for example, topic of study name, lists of users who have authorization to access the topics of study, video games supported, and gaming devices supported. Each topic of study defines content for a specific topic to be incorporated into a specific video game running on a specific gaming device.

Topic of study #1 312 includes text 314, graphics 316, integration points 318, checkpoint questions 320, and passing scores 322. Text 314 and graphics 316 may be, for example, text 240 and graphics 242 in FIG. 2, and represent textual and graphical content corresponding to topic of study 312. Text 314 and graphics 316 are the content that is to be integrated into a video game.

Integration points 318 may be, for example, integration points 230 in FIG. 2, and represent a set of one or more game developer-defined points of integration within in-game assets of a particular video game for topic of study 312 content. Integration points 318 define where text 314 and graphics 316 are to be integrated into a video game.

Checkpoint questions 320 may be, for example, checkpoint questions 236 in FIG. 2, and represent a set of one or more educator-defined questions designed to test a student's knowledge of topic of study 312 content integrated within a video game the student is playing. Checkpoint questions 320 also may list at what point in a particular video game checkpoint questions 320 are to be displayed and answered. Passing scores 322 may be, for example, checkpoint question passing scores 238 in FIG. 2, and represent educator-defined threshold passing scores corresponding to checkpoint questions 320.

Central learning game server 302 also includes user interface 324, which game developers 326 and educators 238 utilize to access central learning game server 302. User interface 324 may be, for example, user interface 226 in FIG. 2, and may be a Web graphical user interface. Game developers 326 may utilize user interface 324 to provide, for example, in-game asset integration point information, such as integration points 318, which corresponds to each particular video game. Educators 238 may utilize user interface 324 to provide, for example, topic of study content, such as text 314, graphics 316, checkpoint questions 320, and passing scores 322 corresponding to topic of study #1 312, which is to be incorporated into video games. Educators 238 also may utilize user interface 324 to provide instructions, such as instructions for incorporating topic content into integration points 234 in FIG. 2, on where and how the topic of study graphical and textual content are to be incorporated into a particular video game.

Client gaming device 306 and client gaming device 308 also connect to network 304. Client gaming device 306 is a client of central learning game server 302 and includes video game A 330, topic of study application programming interface plug-in 332, and user profiles 334. Client gaming device 308 also is a client of central learning game server 302 and includes video game B 336, topic of study application programming interface plug-in 338, and user profiles 340.

Central learning game server 302 is network accessible to video game A 330 and video game B 336 via topic of study application programming interface plug-in 332 and topic of study application programming interface plug-in 338, respectively. Topic of study application programming interface plug-in 332 and topic of study application programming interface plug-in 338 are individually incorporated into video game A 330 and video game B 336, respectively. In this example, video game A 330 and video game B 336 each request content corresponding to topic of study #1 312, which central learning game server 302 sends back to video game A 330 and video game B 336 via topic of study application programming interface plug-in 332 and topic of study application programming interface plug-in 338, respectively.

A student player may view assigned topics of study across all video games and client gaming devices. For example, a student player may log in to his account and view a list of all topics of study assigned to him. The student player also may view which video games and gaming devices support a particular topic of study. The list of assigned topics of study may be customized to show all video games and gaming devices for the assigned topics of study or may be customized to show only the video games and gaming devices owned by the student player.

A student player may launch video game A 330 and select an assigned topic of study, such as topic of study #1 312. Video game A 330, via topic of study application programming interface plug-in 332, sends a request to central learning game server 302 to retrieve content of the selected topic of study. This request may include, for example, video game name, client gaming device, and user profile.

In response, central learning game server 302 returns all topic of study content that matches the video game name, client gaming device, and user profile listed in the request. This matching topic of study content is downloaded onto client gaming device 306 via network 304. If central learning game server 302 returns multiple topics of study for a particular player and video game, client gaming device 306 displays these multiple topics of study to the player who then selects which topic of study the player wants to learn while playing video game A 330.

Topic of study application programming interface plug-in 332 imports the content, such as text and graphics, of the selected topic of study into video game A 330 and incorporates the content into video game A 330 based upon instructions contained within the topic of study content. As the player plays video game A 330, topic of study application programming interface plug-in 332 surfaces the topic of study content throughout regular gameplay of video game A 330 for the player to discover and interact with. In addition, topic of study application programming interface plug-in 332 displays checkpoint questions corresponding to the topic of study content, which the player must answer, at pre-determined times throughout regular gameplay of video game A 330.

The topic of study content also may define a passing score for the checkpoint questions. A player must retry answering checkpoint questions until the player meets the defined passing score or restart the level. Players who achieve a passing score for the checkpoint questions may continue to play video game A 330, additional levels, and so forth. Consequently, educators may evaluate a student's level of knowledge gained while playing video game A 330.

Figure 4:
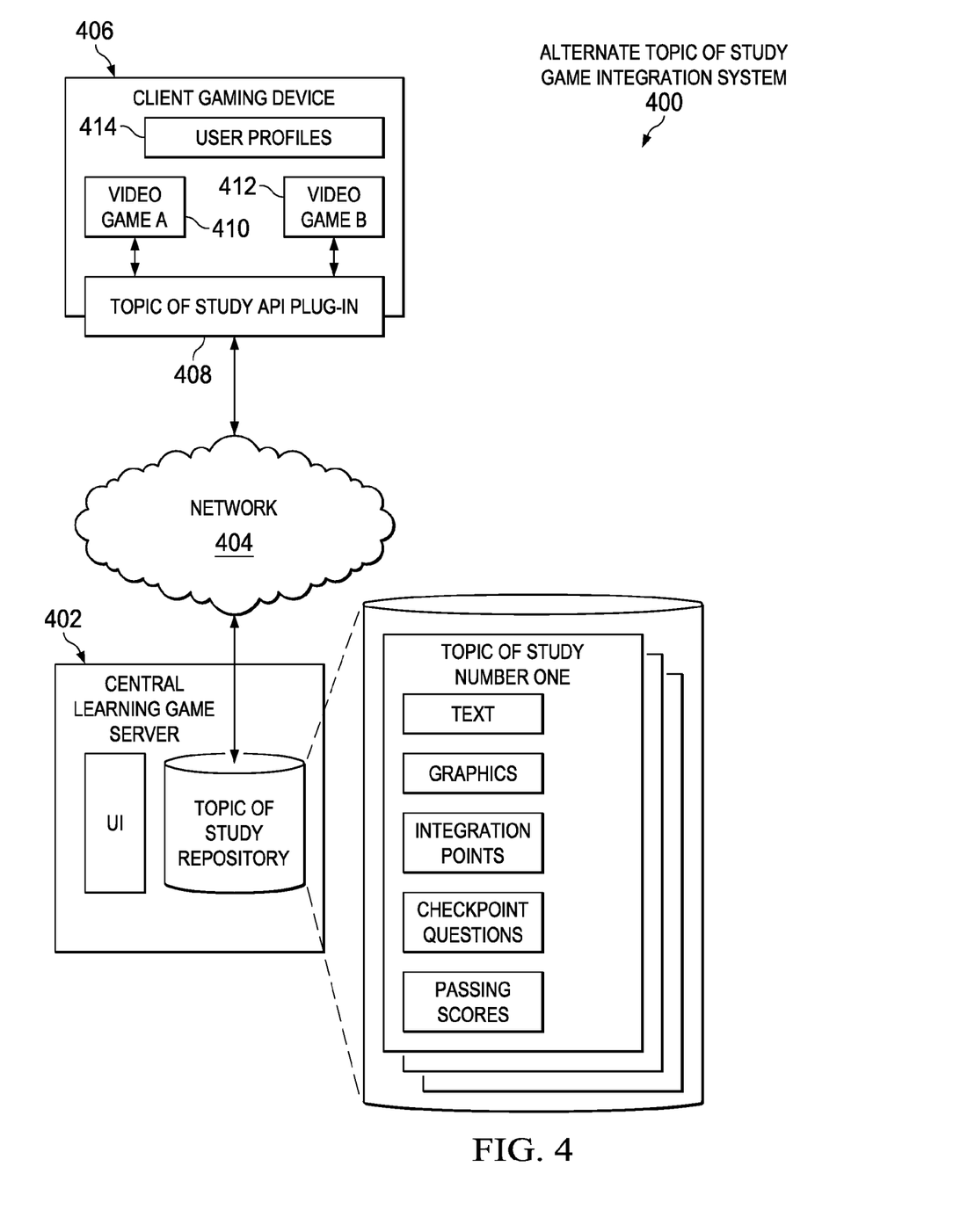
FIG. 4 is a diagram of an example of an alternate topic of study game integration system in accordance with an illustrative embodiment.

With reference now to FIG. 4, a diagram of an example of an alternate topic of study game integration system is depicted in accordance with an illustrative embodiment. Alternate topic of study game integration system 400 may be implemented in a network of distributed data processing systems, such as network data processing system 100 in FIG. 1. In this example, alternate topic of study game integration system 400 includes central learning game server 402, network 404, and client gaming device 406. However, it should be noted that alternate topic of study game integration system 400 is only intended as an example and may include any number of central learning game servers, networks, and client gaming devices.

Alternate topic of study game integration system 400 is similar to topic of study game integration system 300 in FIG. 3. However, it should be noted that alternate topic of study game integration system 400 locates topic of study application programming interface plug-in 408 in client gaming device 406 instead of locating an individual topic of study application programming interface plug-in in each of video game A 410 and video game B 412. In this alternate example, topic of study application programming interface plug-in 408 is incorporated in the operating system of client gaming device 406. As a result, topic of study application programming interface plug-in 408 is accessible to all video games, such as video game A 410 and video game B 412, which run on client gaming device 406. Also, similar to topic of study game integration system 300 in FIG. 3, alternate topic of study game integration system 400 locates user profiles 414 in client gaming device 406.

Figure 5:
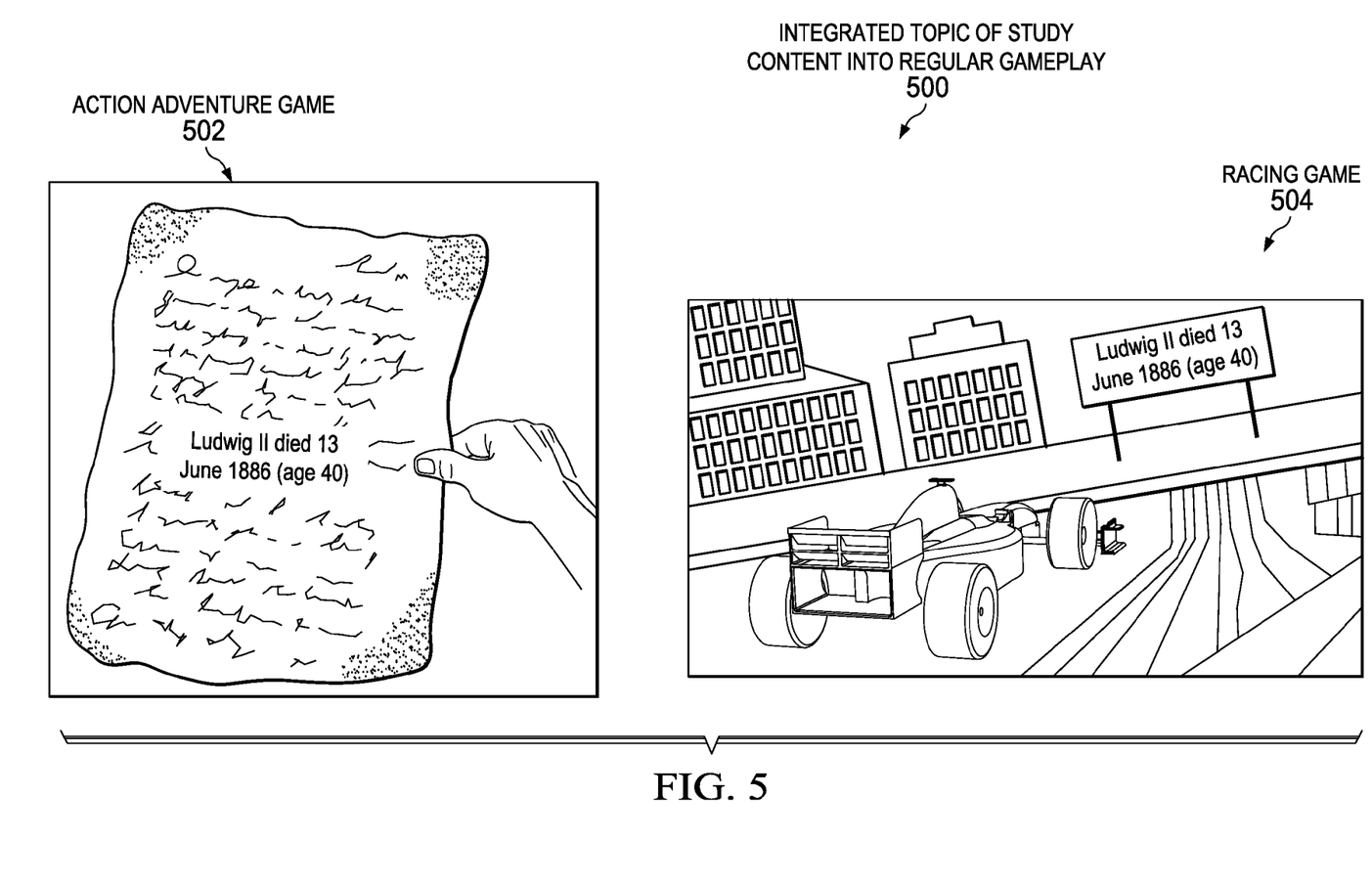
FIG. 5 is an example of integrated topic of study content in accordance with an illustrative embodiment.

With reference now to FIG. 5, an example of integrated topic of study content is depicted in accordance with an illustrative embodiment. Integrated topic of study content into regular gameplay 500 may be implemented in video games, such as, for example, video games 220 in FIG. 2, video games 330 and 336 in FIG. 3, and video games 416 and 420 in FIG. 4. Integrated topic of study content into regular gameplay 500 is topic of study content, such as "Ludwig II died 12 Jun. 1886 (age 40)," which is incorporated into regular gameplay of video games, such as action adventure game 502 and racing game 504.

A topic of study application programming interface (API) plug-in, such as, for example, topic of study application programming interface plug-in 332 in FIG. 3, allows an educator to incorporate educational content into an existing video game. Game developers use this topic of study application programming interface plug-in to support inclusion of topics of study content into their video games. For example, consider a topic of study regarding King Ludwig II. An educator wishes to teach students facts about King Ludwig II by incorporating these facts into existing video games that the educator's students are currently playing. Using the topic of study application programming interface, the educator can prepare textual and graphical information to share about King Ludwig II, and using a markup language the educator can describe how these facts should be presented in a particular video game.

For example, action adventure game 502 incorporates the facts about King Ludwig II by customizing in-game asset notes found by the player in action adventure game 502. The player must find and read all in-game asset notes regarding King Ludwig II in a level to complete the level in action adventure game 502. Racing game 504 utilizes in-game asset billboards to share the facts about King Ludwig II. The player sees these facts as the player completes laps around the race track. As another example, a puzzle video game may show topic of study content, such as pictures of Neuschwanstein Castle, as an in-game background of the puzzle video game. Thus, the topic of study application programming interface plug-in allows educators to incorporate different educational topics of study content into existing video games that students are already familiar with and enjoy playing. Unlike video games created specifically for educational purposes, topic of study application programming interface plug-in-enabled video games maintain the same regular gameplay mechanics that attracted a player to the game in the first place, such as exploring unknown areas, shooting bad guys, and racing against other cars, while incorporating educational content about a particular topic of study so that players may learn while playing.

Further, at pre-determined points within a particular video game, the topic of study application programming interface plug-in may lock progress in the video game until a player successfully completes a series of checkpoint questions corresponding to viewed topic of study content. The topic of study application programming interface plug-in may display these checkpoint questions at the end of a level or after a pre-determined time interval, for example. These checkpoint questions test what the player has learned from the topic of study content incorporated into the video game currently being played by the player. Educators may specify a minimum passing score, which a student must attain before the next level of the video game is unlocked. Students who have not attained the passing score must replay the level, for example. Alternatively, a student who has not attained a passing score may be required to read a key point summary of the topic of study content and then attempt to answer the checkpoint questions again.

Figure 6:
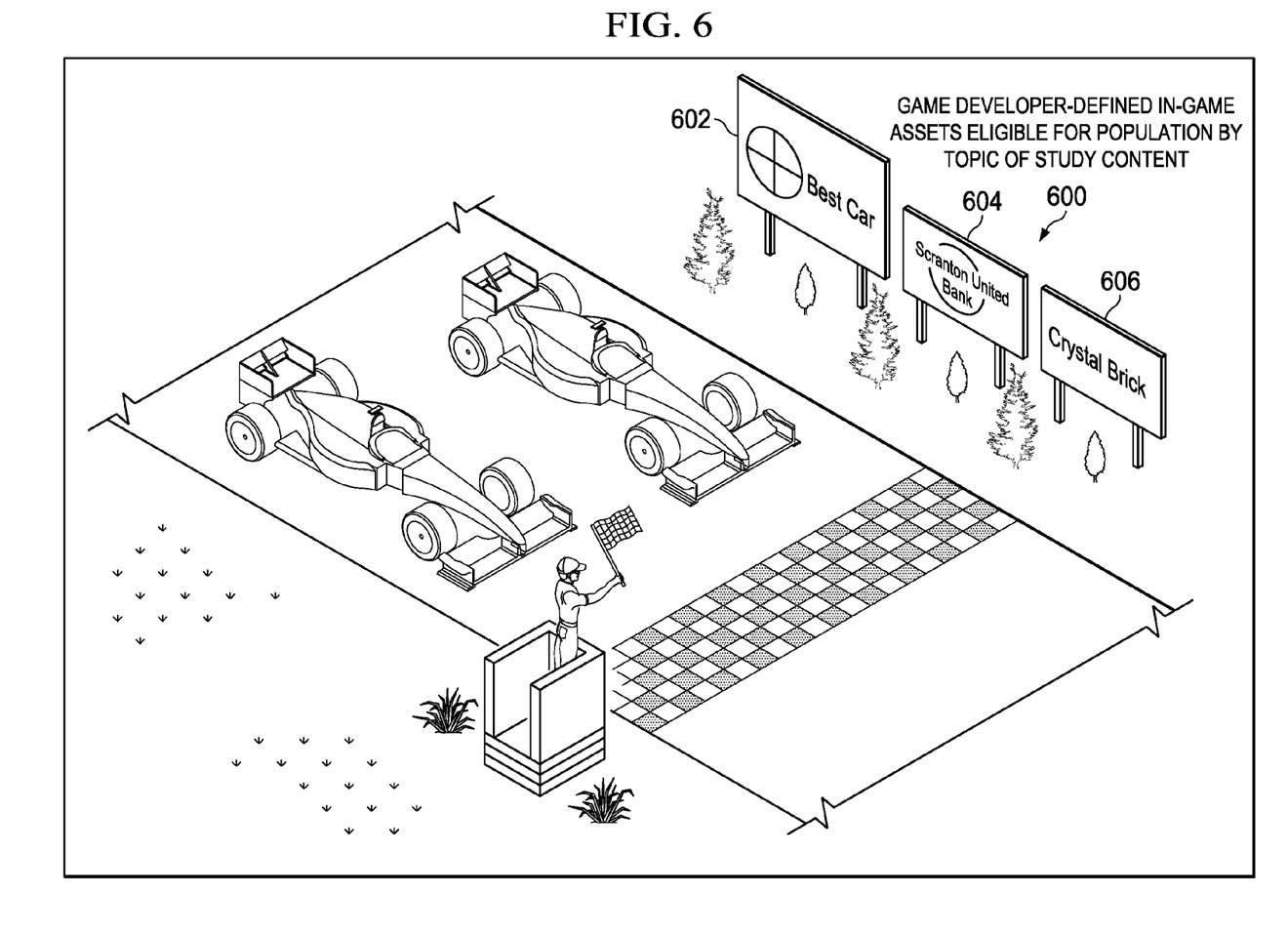
FIG. 6 is an example of game developer-defined in-game assets eligible for population by topic of study content in accordance with an illustrative embodiment.

With reference now to FIG. 6, an example of game developer-defined in-game assets eligible for population by topic of study content is depicted in accordance with an illustrative embodiment. Game developer-defined in-game assets eligible for population by topic of study content 600 may be implemented in video games, such as, for example, video games 220 in FIG. 2, video games 330 and 336 in FIG. 3, and video games 416 and 420 in FIG. 4. Game developer-defined in-game assets eligible for population by topic of study content 600 are in-game assets, such as, for example, billboards, signs, backgrounds, walls, buildings, and the like within a video game, which a game developer identifies as being eligible to population by topic of study content. In this example, game developer-defined in-game assets eligible for population by topic of study content are in-game asset 602, in-game asset 604, and in-game asset 606.

Details on incorporation of topic of study content into a particular video game are described below. First, a game developer identifies in-game asset integration points, such as in-game asset 602, in-game asset 604, and in-game asset 606, at development time. In other words, a game developer specifies which in-game assets, such as in-game asset 602, in-game asset 604, and in-game asset 606, are eligible to integrate topic of study content. In addition, the game developer defines what each in-game asset can display, such as, for example, in-game asset 602 may display both textual and graphical topic of study content, whereas in-game asset 604 may only display textual topic of study content and in-game asset 606 may only display graphical topic of study content.

For example, the game developer of the racing video game may define the characteristics that each in-game asset integration point may support, such as: Billboard in-game asset 602: graphics—up to 300×300 pixels, text—up to 100 words; Billboard in-game asset 604: graphics—not supported, text—up to 75 words; and Billboard in-game asset 606: graphics up to 200×400 pixels, text—not supported.

Second, an educator identifies or creates topic of study content, which is to be incorporated into a video game at runtime at the pre-defined in-game asset integration points. When a player launches a video game, the player selects a topic of study assigned by an educator to the player that the player wishes to integrate into the video game. A topic of study application programming interface plug-in, such as topic of study application programming interface plug-in 416 in FIG. 4, retrieves the appropriate topic of study content from a central learning game server, such as central learning game server 402 in FIG. 4, and integrates the retrieved topic of study content into the video game. The topic of study application programming interface plug-in integrates the retrieved topic of study content into the in-game assets as defined by the game developer above.

The topic of study application programming interface plug-in may integrate the retrieved topic of study content into the in-game assets using one of several different methods. One method may be a best-fit placement method where each topic of study content item defined by an educator is integrated into an in-game asset that best fits the particular item. For example, the topic of study application programming interface plug-in may integrate topic of study content item #1, which is textual content, into the first in-game asset that supports embedding text and the topic of study application programming interface plug-in may integrate topic of study content item #2, which is textual and graphical content, into the first in-game asset that supports both text and graphics.

Another method may be a sequential placement method where the order of topic of study content items in the topic of study is important. As a result, the topic of study application programming interface plug-in integrates the topic of study content items in sequential order. For example, no matter how the student plays a particular video game, the topic of study application programming interface plug-in always displays topic of study content item #1 first, topic of study content item #2 second, and so on, until the entire sequence of content items is completed.

A third method may be a topic of study-defined placement method where the educator creating the topics of study content items defines which in-game asset integration points will show which particular topic of study content items. For example, an educator may define that facts about King Ludwig II are shown in video game X, in level 3, which is set in Bavaria, at in-game asset integration points 1-10. If a student plays a different video game other than video game X, then the topic of study application programming interface plug-in may ignore the educator-defined topic of study content placement instructions and use an alternate placement method, such as sequential placement.

Figure 7:
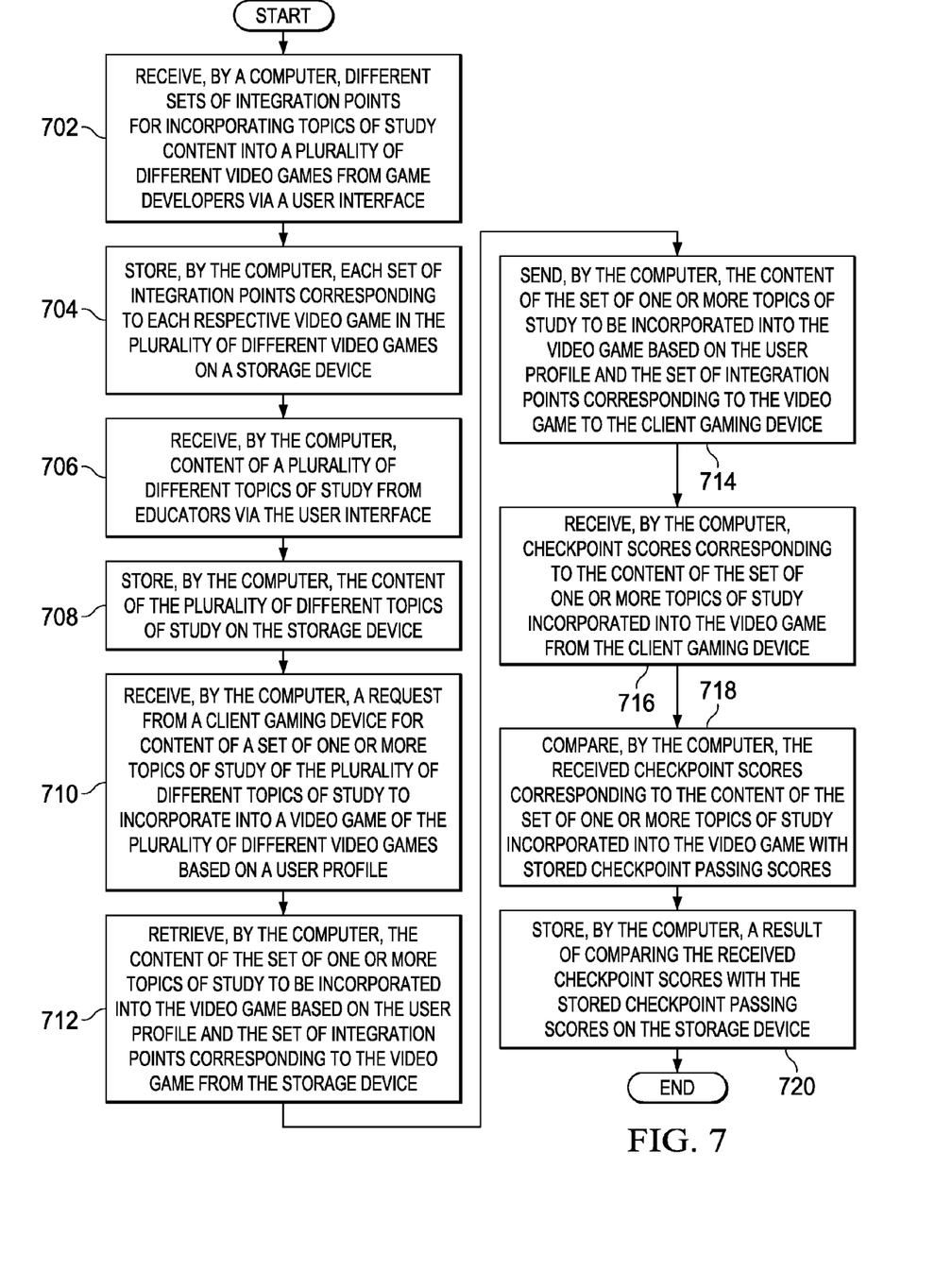
FIG. 7 is a flowchart illustrating a process of game server computer for integrating topic of study content into a video game consistent with regular gameplay of the video game in accordance with an illustrative embodiment.

With reference now to FIG. 7, a flowchart illustrating a process of game server computer for integrating topic of study content into a video game consistent with regular gameplay of the video game is shown in accordance with an illustrative embodiment. The process shown in FIG. 7 may be implemented in a central learning game server computer, such as, for example, server 104 in FIG. 1, data processing system 200 in FIG. 2, and central learning game server 302 in FIG. 3.

The process begins when the computer receives different sets of integration points for incorporating topics of study content into a plurality of different video games from game developers via a user interface (step 702). In addition, the computer stores each set of integration points corresponding to each respective video game in the plurality of different video games on a storage device (step 704). Further, the computer receives content of a plurality of different topics of study from educators via the user interface (step 706). The computer also stores the content of the plurality of different topics of study on the storage device (step 708).

Subsequently, the computer receives a request from a client gaming device for content of a set of one or more topics of study of the plurality of different topics of study to incorporate into a video game of the plurality of different video games based on a user profile (step 710). The computer retrieves the content of the set of one or more topics of study to be incorporated into the video game based on the user profile and the set of integration points corresponding to the video game from the storage device (step 712). Furthermore, the computer sends the content of the set of one or more topics of study to be incorporated into the video game based on the user profile and the set of integration points corresponding to the video game to the client gaming device (step 714).

Afterward, the computer receives checkpoint scores corresponding to the content of the set of one or more topics of study incorporated into the video game from the client gaming device (step 716). The computer compares the received checkpoint scores corresponding to the content of the set of one or more topics of study incorporated into the video game with stored checkpoint passing scores (step 718). Based on comparing the received checkpoint scores with the stored checkpoint passing scores, the computer may instruct the client gaming device to stop further progress in the video game based on finding a failing score or may instruct the client gaming device to allow further progress in the video game based on finding a passing score. Then, the computer stores a result of comparing the received checkpoint scores with the stored checkpoint passing scores on the storage device (step 720). Thereafter, the process terminates.

Figure 8:
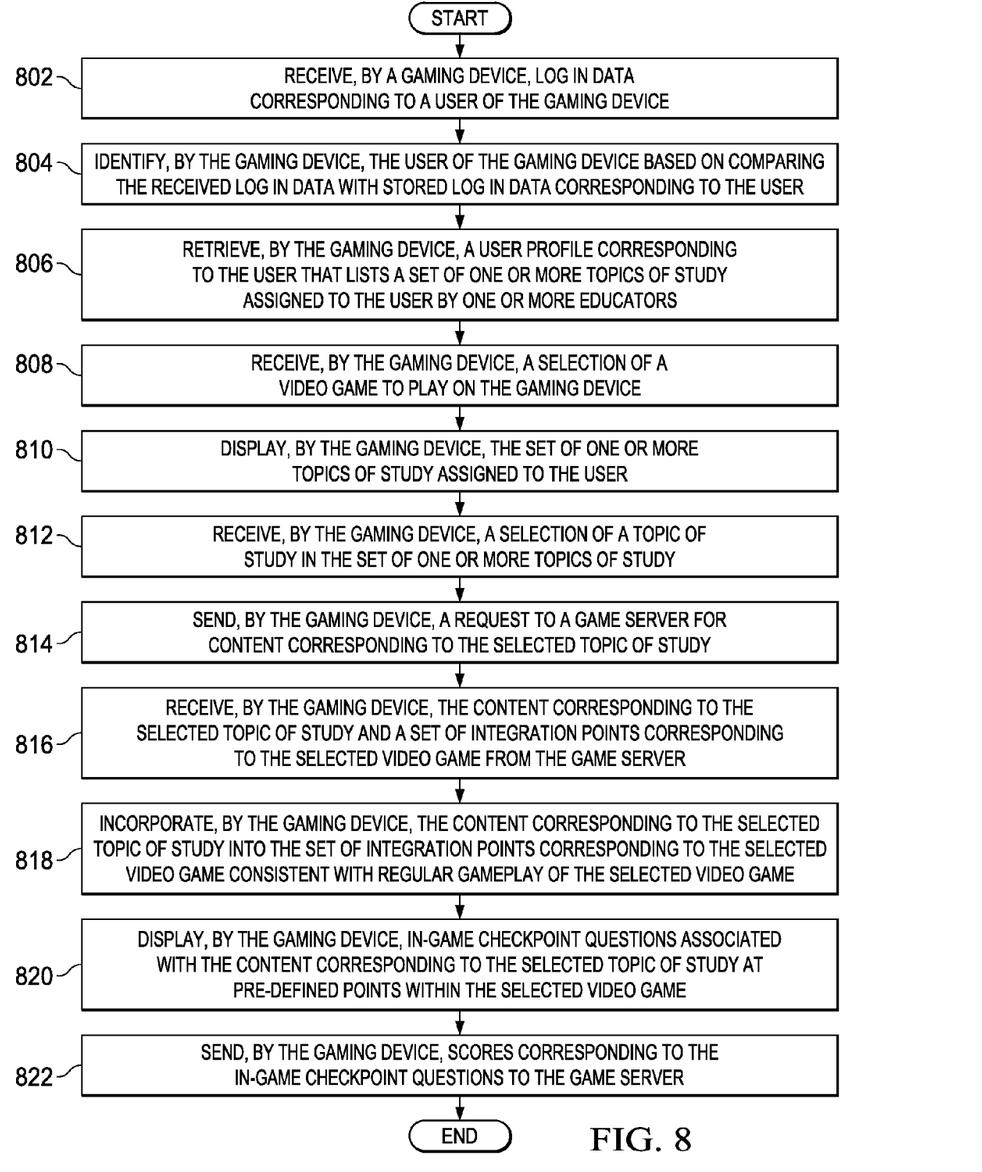
FIG. 8 is a flowchart illustrating a process of a client gaming device for integrating topic of study content into a video game based on user profile information in accordance with an illustrative embodiment.

With reference now to FIG. 8, a flowchart illustrating a process of a client gaming device for integrating topic of study content into a video game based on user profile information is shown in accordance with an illustrative embodiment. The process shown in FIG. 8 may be implemented in a client gaming device, such as, for example, client 110 in FIG. 1.

The process begins when the gaming device receives log in data corresponding to a user of the gaming device (step 802). The gaming device identifies the user of the gaming device based on comparing the received log in data with stored log in data corresponding to the user (step 804). In addition, the gaming device retrieves a user profile corresponding to the user that lists a set of one or more topics of study assigned to the user by one or more educators (step 806).

Afterward, the gaming device receives a selection of a video game to play on the gaming device (step 803). The gaming device displays the set of one or more topics of study assigned to the user (step 810). Subsequently, the gaming device receives a selection of a topic of study in the set of one or more topics of study (step 812).

The gaming device sends a request to a game server for content corresponding to the selected topic of study (step 814). Then, the gaming device receives the content corresponding to the selected topic of study and a set of integration points corresponding to the selected video game from the game server (step 816). The gaming device incorporates the content corresponding to the selected topic of study into the set of integration points corresponding to the selected video game consistent with regular gameplay of the selected video game (step 818).

The gaming device also displays in-game checkpoint questions associated with the content corresponding to the selected topic of study at pre-defined points within the selected video game (step 820). Further, the gaming device sends scores corresponding to the in-game checkpoint questions to the game server (step 822). Thereafter, the process terminates.

Thus, illustrative embodiments provide a computer-implemented method, computer system, and computer program product for integrating topic of study content into regular gameplay of existing video games using topic of study application programming interface plug-ins and integration points. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for integrating topic of study content into video games, the computer-implemented method comprising:
   retrieving, by a gaming device, a user profile corresponding to a user of the gaming device that lists topics of study assigned to the user by educators from a storage of the gaming device based on log in data corresponding to the user;
   receiving, by the gaming device, a selection of a video game to play on the gaming device;
   receiving, by the gaming device, a selection of a topic of study in the topics of study;
   sending, by the gaming device, a request to a game server for content corresponding to the selected topic of study;
   receiving, by the gaming device, the content corresponding to the selected topic of study and a set of integration points corresponding to the selected video game from the game server; and
   incorporating, by the gaming device, the content corresponding to the selected topic of study into the set of integration points corresponding to the selected video game based on instructions included in the content that define where the gaming device is to incorporate the content into the set of integration points while the user is playing the selected video game.

2. The computer-implemented method of claim 1 further comprising:
   displaying, by the gaming device, in-game checkpoint questions added by the educators at pre-defined points within the selected video game to test the user's knowledge of the content of the selected topic of study incorporated into the selected video game; and
   comparing, by the gaming device, checkpoint scores corresponding to the in game checkpoint questions with passing checkpoint scores.

3. The computer-implemented method of claim 2 further comprising:
   locking, by the gaming device, progress at pre-determined points in the selected video game until the user successfully completes a series of the in-game checkpoint questions corresponding to viewed topic of study content.

4. The computer-implemented method of claim 1, wherein the gaming device is one of a desktop computer, a laptop computer, a tablet computer, a handheld computer, a smart phone, a smart watch, a personal digital assistant, or a gaming device with a network connection, and wherein the user of the gaming device utilizes the gaming device to complete the topics of study assigned by the educators to the user while the user plays video games.

5. The computer-implemented method of claim 1, wherein the game server is a cloud-based central learning game server with a network connection, and wherein the cloud-based central learning game server controls integration of topic of study content into a plurality of different types of video games currently being played by a plurality of different client gaming device users consistent with regular gameplay of the plurality of different types of video games.

6. The computer-implemented method of claim 1, wherein the gaming device includes a topic of study application programming interface plug-in incorporated into an operating system of the gaming device, and wherein the topic of study application programming interface plug-in is accessible to video games run on the gaming device.

7. The computer-implemented method of claim 1, wherein the content of the selected topic of study incorporated into the selected video game also includes checkpoint questions corresponding to the content, and passing scores corresponding to the checkpoint questions.

8. A gaming device for integrating topic of study content into video games, the gaming device comprising:
   a bus system;
   a storage device connected to the bus system, wherein the storage device stores program instructions; and
   a processor connected to the bus system, wherein the processor executes the program instructions to:
   retrieve a user profile corresponding to a user of the gaming device that lists topics of study assigned to the user by educators from a storage of the gaming device based on log in data corresponding to the user;
   receive a selection of a video game to play on the gaming device;
   receive a selection of a topic of study in the topics of study;
   send a request to a game server for content corresponding to the selected topic of study;
   receive the content corresponding to the selected topic of study and a set of integration points corresponding to the selected video game from the game server; and
   incorporate the content corresponding to the selected topic of study into the set of integration points corresponding to the selected video game based on instructions included in the content that define where the gaming device is to incorporate the content into the set of integration points while the user is playing the selected video game.

9. The gaming device of claim 8, wherein the processor further executes the program instructions to:
   display in-game checkpoint questions added by the educators at pre-defined points within the selected video game to test the user's knowledge of the content of the selected topic of study incorporated into the selected video game; and
   compare checkpoint scores corresponding to the in game checkpoint questions with passing checkpoint scores.

10. The gaming device of claim 9, wherein the processor further executes the program instructions to:

lock progress at pre-determined points in the selected video game until the user successfully completes a series of the in-game checkpoint questions corresponding to viewed topic of study content.

11. A computer program product for integrating topic of study content into video games, the computer program product comprising a computer readable storage medium having program instructions embodied therewith, the program instructions executable by a gaming device to cause the gaming device to perform a method comprising:

retrieving, by the gaming device, a user profile corresponding to a user of the gaming device that lists topics of study assigned to the user by educators from a storage of the gaming device based on log in data corresponding to the user;

receiving, by the gaming device, a selection of a video game to play on the gaming device;

receiving, by the gaming device, a selection of a topic of study in the topics of study;

sending, by the gaming device, a request to a game server for content corresponding to the selected topic of study;

receiving, by the gaming device, the content corresponding to the selected topic of study and a set of integration points corresponding to the selected video game from the game server; and incorporating, by the gaming device, the content corresponding to the selected topic of study into the set of integration points corresponding to the selected video game based on instructions included in the content that define where the gaming device is to incorporate the content into the set of integration points while the user is playing the selected video game.

12. The computer program product of claim 11 further comprising:

displaying, by the gaming device, in-game checkpoint questions added by the educators at pre-defined points within the selected video game to test the user's knowledge of the content of the selected topic of study incorporated into the selected video game; and comparing, by the gaming device, checkpoint scores corresponding to the in game checkpoint questions with passing checkpoint scores.

13. The computer program product of claim 12 further comprising:

locking, by the gaming device, progress at pre-determined points in the selected video game until the user successfully completes a series of the in-game checkpoint questions corresponding to viewed topic of study content.

14. The computer program product of claim 11, wherein the gaming device is one of a desktop computer, a laptop computer, a tablet computer, a handheld computer, a smart phone, a smart watch, a personal digital assistant, or a gaming device with a network connection, and wherein the user of the gaming device utilizes the gaming device to complete the topics of study assigned by the educators to the user while the user plays video games.

15. The computer program product of claim 11, wherein the game server is a cloud-based central learning game server with a network connection, and wherein the cloud-based central learning game server controls integration of topic of study content into a plurality of different types of video games currently being played by a plurality of different client gaming device users consistent with regular gameplay of the plurality of different types of video games.

16. The computer program product of claim 11, wherein the gaming device includes a topic of study application programming interface plug-in incorporated into an operating system of the gaming device, and wherein the topic of study application programming interface plug-in is accessible to video games run on the gaming device.

17. The computer program product of claim 11, wherein the content of the selected topic of study incorporated into the selected video game also includes checkpoint questions corresponding to the content, and passing scores corresponding to the checkpoint questions.

* * * * *